US012485742B2

(12) United States Patent
Ramirez Ruiz

(10) Patent No.: US 12,485,742 B2
(45) Date of Patent: Dec. 2, 2025

(54) WHEEL DEVICE WITH INTEGRATED ELECTRIC MOTOR FOR A MOTOR VEHICLE

(71) Applicant: FERRARI S.P.A., Modena (IT)

(72) Inventor: Isabel Ramirez Ruiz, Modena (IT)

(73) Assignee: FERRARI S.P.A., Modena (IT)

( * ) Notice: Subject to any disclaimer, the term of this patent is extended or adjusted under 35 U.S.C. 154(b) by 328 days.

(21) Appl. No.: 18/304,392

(22) Filed: Apr. 21, 2023

(65) Prior Publication Data

US 2023/0347730 A1 Nov. 2, 2023

(30) Foreign Application Priority Data

Apr. 27, 2022 (IT) ......................... 102022000008270

(51) Int. Cl.
*B60K 7/00* (2006.01)

(52) U.S. Cl.
CPC .... *B60K 7/0007* (2013.01); *B60K 2007/0038* (2013.01); *B60K 2007/0092* (2013.01)

(58) Field of Classification Search
CPC .................................................. B60K 7/0007
See application file for complete search history.

(56) References Cited

U.S. PATENT DOCUMENTS

| | | | | |
|---|---|---|---|---|
| 7,466,049 | B1 * | 12/2008 | Vancea ..................... | B60K 6/26 310/198 |
| 2003/0015360 | A1 * | 1/2003 | Villeneuve ........... | B60K 7/0007 180/65.6 |
| 2004/0099455 | A1 * | 5/2004 | Nagaya ................... | F16F 15/18 180/65.51 |
| 2004/0212259 | A1 * | 10/2004 | Gould ...................... | H02K 7/14 310/67 R |
| 2008/0070736 | A1 * | 3/2008 | Yoshino ............... | B60K 7/0007 301/6.5 |
| 2010/0319345 | A1 * | 12/2010 | Sinan ....................... | B60K 6/46 60/613 |

(Continued)

FOREIGN PATENT DOCUMENTS

CN 103112313 A 5/2013
CN 113799595 A 12/2021

(Continued)

OTHER PUBLICATIONS

Italian Search Report for Application No. 102022000008270; Filing Date: Apr. 27, 2022; Date of Mailing—Dec. 19, 2022, 20 pages.

*Primary Examiner* — Erez Gurari
(74) *Attorney, Agent, or Firm* — CANTOR COLBURN LLP

(57) ABSTRACT

A wheel device for a motor vehicle includes a rim having an axis and an outer surface defining a seat for mounting a tire, a wheel hub arranged about the axis inside the rim and suitable to be coupled to a suspension of the motor vehicle, an electric motor comprising a stator arranged coaxially with the wheel hub in a fixed position with respect to the wheel hub and a rotor configured to magnetically interact with the stator, a radial bearing supporting the rotor rotatably about said axis with respect to the wheel and to the stator, wherein the rim is fitted on the rotor with interference, whereby the rim is fixed with respect to the rotor.

12 Claims, 5 Drawing Sheets

(56) References Cited

U.S. PATENT DOCUMENTS

| | | | | |
|---|---|---|---|---|
| 2012/0067654 | A1* | 3/2012 | Carabelli | H02K 7/102 |
| | | | | 301/6.5 |
| 2012/0270692 | A1* | 10/2012 | Hoebel | H02K 21/02 |
| | | | | 475/167 |
| 2013/0069462 | A1* | 3/2013 | Calvert | F16C 39/02 |
| | | | | 310/88 |
| 2015/0298537 | A1* | 10/2015 | Duhamel | H02K 9/16 |
| | | | | 301/6.5 |
| 2017/0058975 | A1* | 3/2017 | Szewczyk | F16D 65/12 |
| 2017/0259663 | A1* | 9/2017 | Chan | B60K 17/046 |
| 2018/0015823 | A1* | 1/2018 | Wu | B60K 7/0007 |
| 2019/0023128 | A1* | 1/2019 | Tesar | B60K 17/08 |
| 2021/0362584 | A1* | 11/2021 | Liu | B60K 17/046 |
| 2023/0261539 | A1* | 8/2023 | Chung | H02K 5/10 |
| | | | | 310/67 R |
| 2023/0347730 | A1* | 11/2023 | Ramirez Ruiz | B60T 1/065 |
| 2025/0033459 | A1* | 1/2025 | Suto | H02K 5/1737 |

FOREIGN PATENT DOCUMENTS

| | | |
|---|---|---|
| DE | 102008004081 A1 | 7/2009 |
| EP | 0650644 A1 | 5/1995 |
| EP | 1252034 B1 | 11/2004 |
| EP | 3083307 B1 | 12/2014 |
| WO | 2022058093 A1 | 3/2022 |

\* cited by examiner

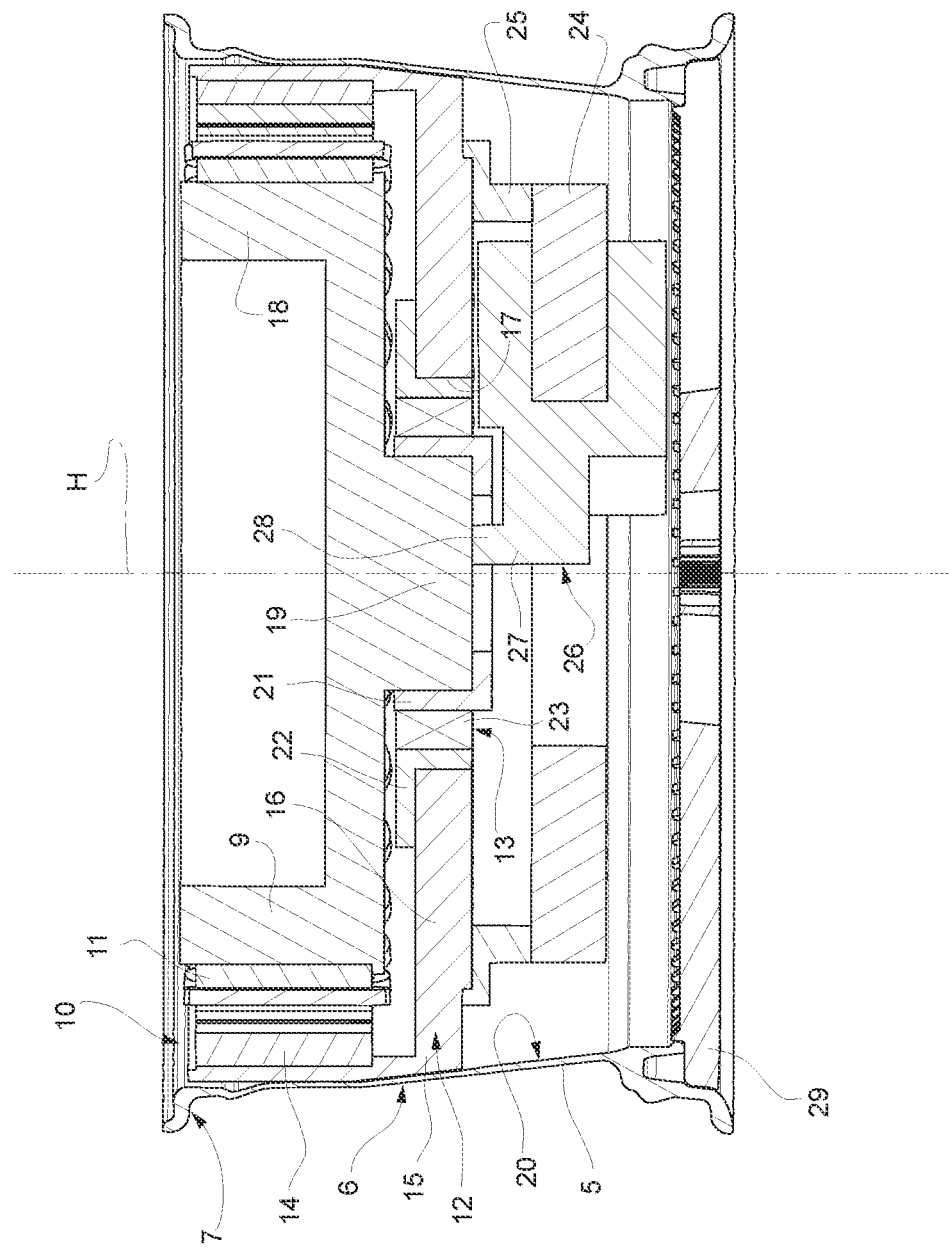

WHEEL DEVICE WITH INTEGRATED ELECTRIC MOTOR FOR A MOTOR VEHICLE

CROSS-REFERENCE TO RELATED PATENT APPLICATIONS

This patent application claims priority to Italian Patent Application No. 102022000008270 filed on Apr. 27, 2022, the content of which is hereby incorporated by reference.

TECHNICAL FIELD

The invention relates to a wheel device, or more simply a wheel, for a motor vehicle, particularly of the sports type.

PRIOR ART

In the art, the idea of integrating an electric motor onto a wheel of a motor vehicle has been explored several times.

The electric motor integration on the wheel makes the use of transmissions unnecessary, making the vehicle more efficient.

The placement of the electric motor in the wheel allows a significant increase in the interior space of the vehicle, benefiting passengers and luggage. Moreover, an appropriate suspension scheme makes possible better control of pitching and rolling movements during transients.

On the other hand, the complexity of the wheel increases with the rising number of required components, along with a relative increase in costs.

Therefore, there is a perceived need to provide wheel devices with an integrated electric motor that are alternative to those already known, and more specifically simplified, e.g., by reducing the number of components and/or mechanical connections, without sacrificing performance, efficiency, or reliability.

An object of the invention is to satisfy the above requirement, preferably in a simple and cost-effective manner.

DESCRIPTION OF THE INVENTION

The object is achieved by a wheel device as defined in claim 1.

The dependent claims define particular embodiments of the invention.

BRIEF DESCRIPTION OF THE DRAWINGS

In the following, an embodiment of the invention is described for a better understanding thereof by way of non-limiting example and with reference to the accompanying drawings in which:

FIG. 5 is a section of the wheel device according to a section plane identified in FIG. 2 by section lines V-V.

EMBODIMENTS OF THE INVENTION

Figure 1:
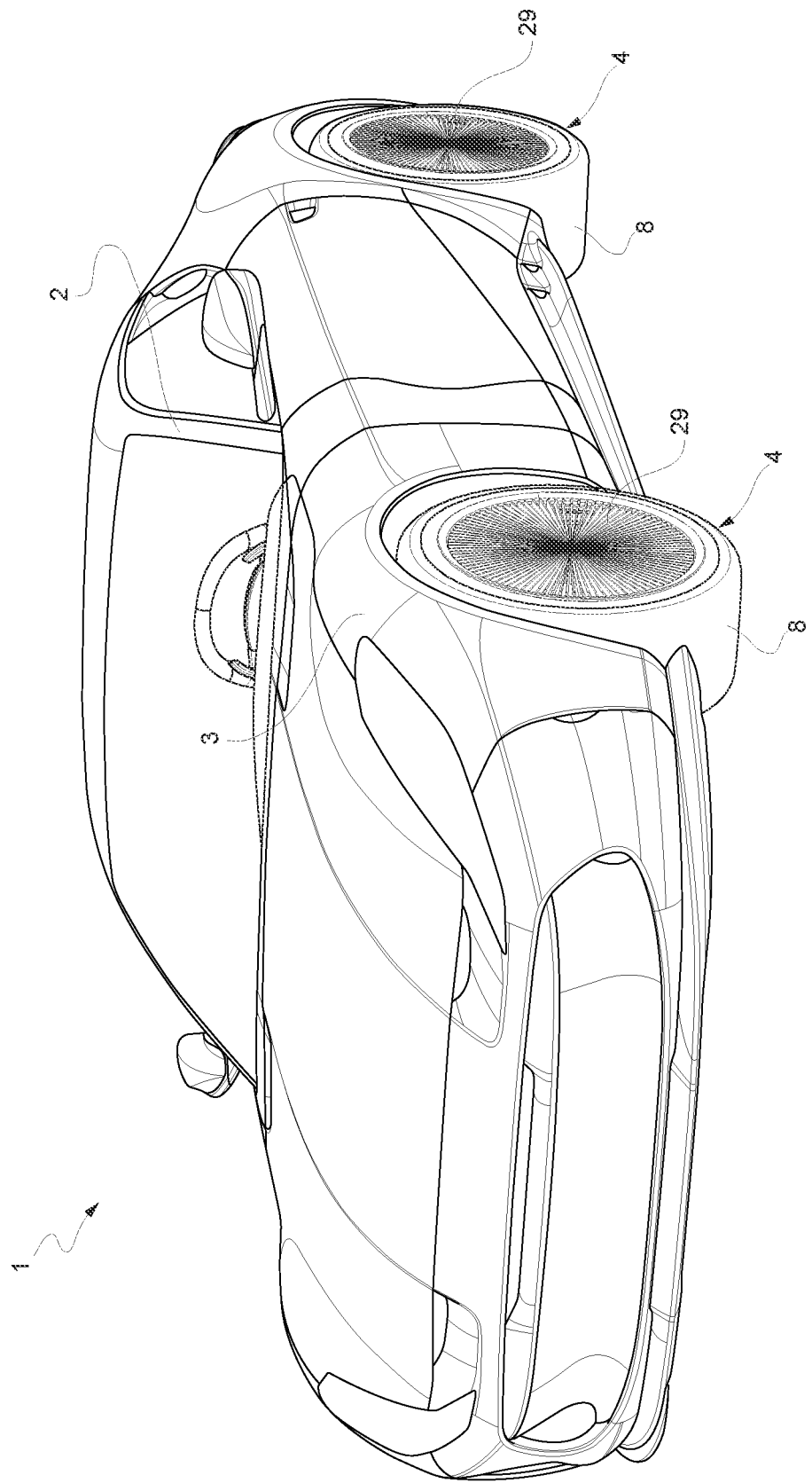
FIG. 1 is a perspective view of a vehicle comprising a wheel device in accordance with the invention.

In FIG. 1, reference numeral 1 is used to indicate, as a whole, a motor vehicle.

The motor vehicle 1 comprises a body 2, which in turn includes a frame (not shown) and a bodywork 3 supported by the frame, defining the external surfaces of the motor vehicle 1.

Further, the motor vehicle 1 comprises a plurality of wheels or wheel devices 4, only two of which are illustrated in FIG. 1. The wheels 4 are coupled to the body 2 or more precisely to the frame by means of suspensions and are not illustrated.

The wheels 4 define the non-suspended mass of the motor vehicle 1. The suspensions suspend the body 2 or more precisely the frame with respect to the wheels 4, whereby the body 2 is part of the suspended mass of the motor vehicle 1.

The wheels 4 have similar characteristics to each other, with some exceptions, such as dimensions, so only one of the wheels 4 will be described in greater detail. However, it should be noted that the characteristics described for one of the wheels 4 are also applicable to the others.

The wheel 4 comprises a rim 5 having in particular a tubular geometry. The rim 5 has an axis H, around which the rim 5 extends thus defining a revolution solid.

The axis H is transversal with respect to an advancing direction of the motor vehicle 1.

The rim 5 further has an outer surface 6 extending about the axis H, thus defining a revolution surface.

The outer surface 6 defines a seat or channel 7 configured to receive a tire 8 of the wheel 4. The tire 8 is mounted on the rim 5 at the seat 7, in particular according to typical modes.

In other words, the seat 7 allows the mounting of the tire 8.

Furthermore, the wheel 4 comprises a wheel hub 9, an electric motor 10 with a stator 11 fixed with respect to the wheel hub 9 and a rotor 12 fixed with respect to the rim 5, and at least one radial bearing 13 supporting the rotor 12 and therefore the rim 5 on the wheel hub 9 rotatably about the axis H with respect to the wheel hub 9 and consequently to the stator 11.

The wheel hub 9 is arranged about the axis H within the rim 5. In other words, the wheel hub 9 is coaxial to the rim. The wheel hub 9 is coupled to one of the suspensions of the motor vehicle 1. Therefore, the body 2 is suspended with respect to the wheel hub 9 by means of the latter suspension.

The stator 11 is coaxial or arranged coaxially with the wheel hub 9. In particular, the stator 11 is radially outer than the wheel hub 9. More particularly, the stator 11 is directly fitted on the wheel hub 9.

Therefore, the wheel hub 9 is or defines a stator support. In fact, the term "wheel hub" can be anywhere replaceable with stator support.

The rotor 12 is configured to magnetically interact with the stator 11, as is normally the case according to the prior art. In fact, the magnetic interaction between the rotor 12 and the stator 11 allows the rotor 12 to rotate with respect to the stator 11 about the axis H.

In such case, the electric motor 10 is an AC motor, more specifically a permanent magnet synchronous motor, in particular brushless.

In more detail, the rotor 12 comprises a portion 14 coaxial or arranged coaxially with the stator 11 and arranged in a radially outer position with respect to the stator 11.

In particular, the stator 11 is at least partly arranged within the portion 14. In fact, the portion 14 has an annular shape and therefore defines a rotor ring about the axis H. The stator 11 is at least partially inside the ring or radially covered by the ring.

The portion 14 or optionally another portion of the rotor 12 comprises one or more permanent magnets or polar pairs configured to generate a magnetic flux, specifically directed radially towards the stator 11 or the axis H.

Stator 11 comprises electrical windings 30 configured to generate a magnetic field in response to a flow of electrical current through the windings 30. In other words, the electric windings 30 may be connected to an electric power source, e.g., a battery of the motor vehicle 1, to be powered by electric current. The electric power supply causes the generation of the magnetic field.

The magnetic field interacts with the magnetic flux generated by the permanent magnets of the rotor 12. The magnetic interaction between the magnetic flux and the magnetic field triggers the relative rotation of the rotor 12 with respect to the stator 11.

Conversely, as is well-known in the technical field of electric motors, if the rotor 12 were to be rotated by causes other than the magnetic interaction, the electric motor 10 could behave as an electrical generator.

Conveniently, the powering of the electric windings 30 can be actively controlled by a special control unit of the motor vehicle 1 or the wheel 4. In this way, the behavior of the electric motor 10 as motor o generator is fully controllable by the control unit.

According to the invention, the rim 5 is fitted onto the rotor 12 with interference i.e., by bringing the rim 5 and the rotor 12 into mutual contact, such that the rim 5 is fixed relative to the rotor 12. Then, a rotation of the rotor 12 about the axis H is directly transmitted to the rim 5.

Thus, it follows that the rim 5 is in mutual contact with the rotor 12 at an interference zone, wherein the rotor 12 is coupled to the rim 5 with or by interference.

Preferably, as can be inferred from the figures, the interference zone between the rim 5 and the rotor 12 is radially aligned with the radial bearing 13.

Figure 2:
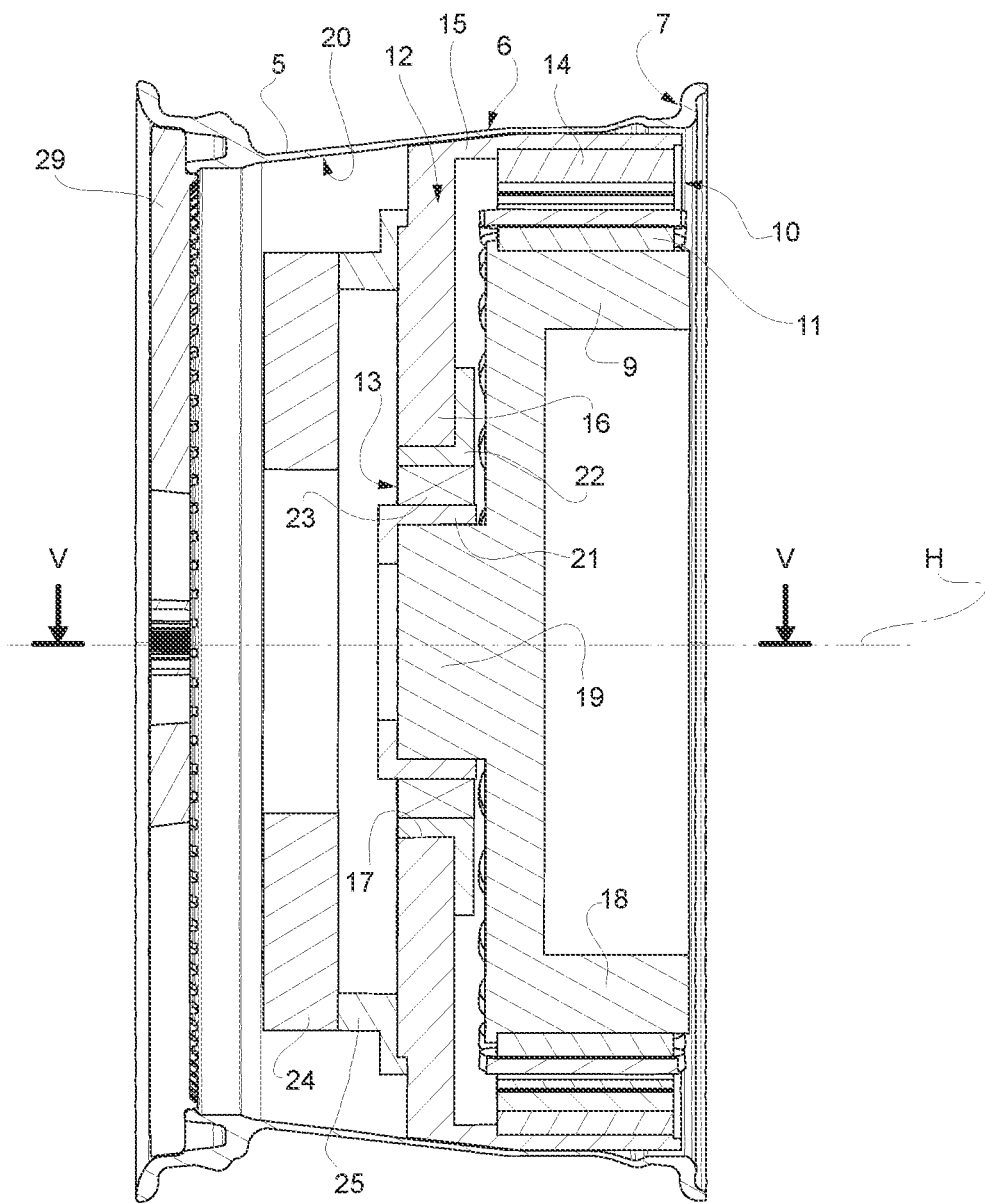
FIG. 2 is a section of the wheel device according to a plane orthogonal to an axis of the wheel device.
Figure 3:
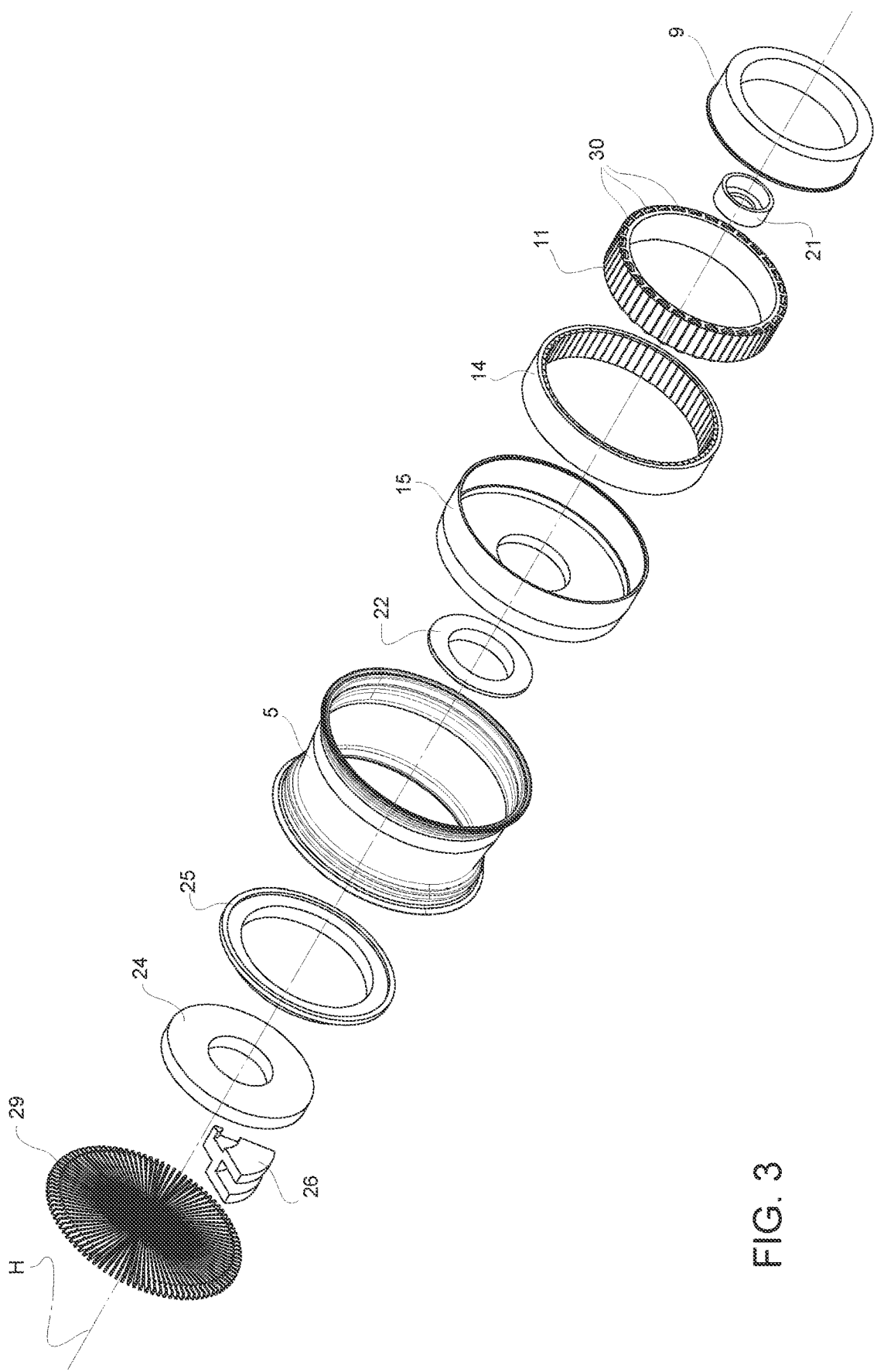
FIG. 3 is an exploded view of the wheel device.
Figure 4:
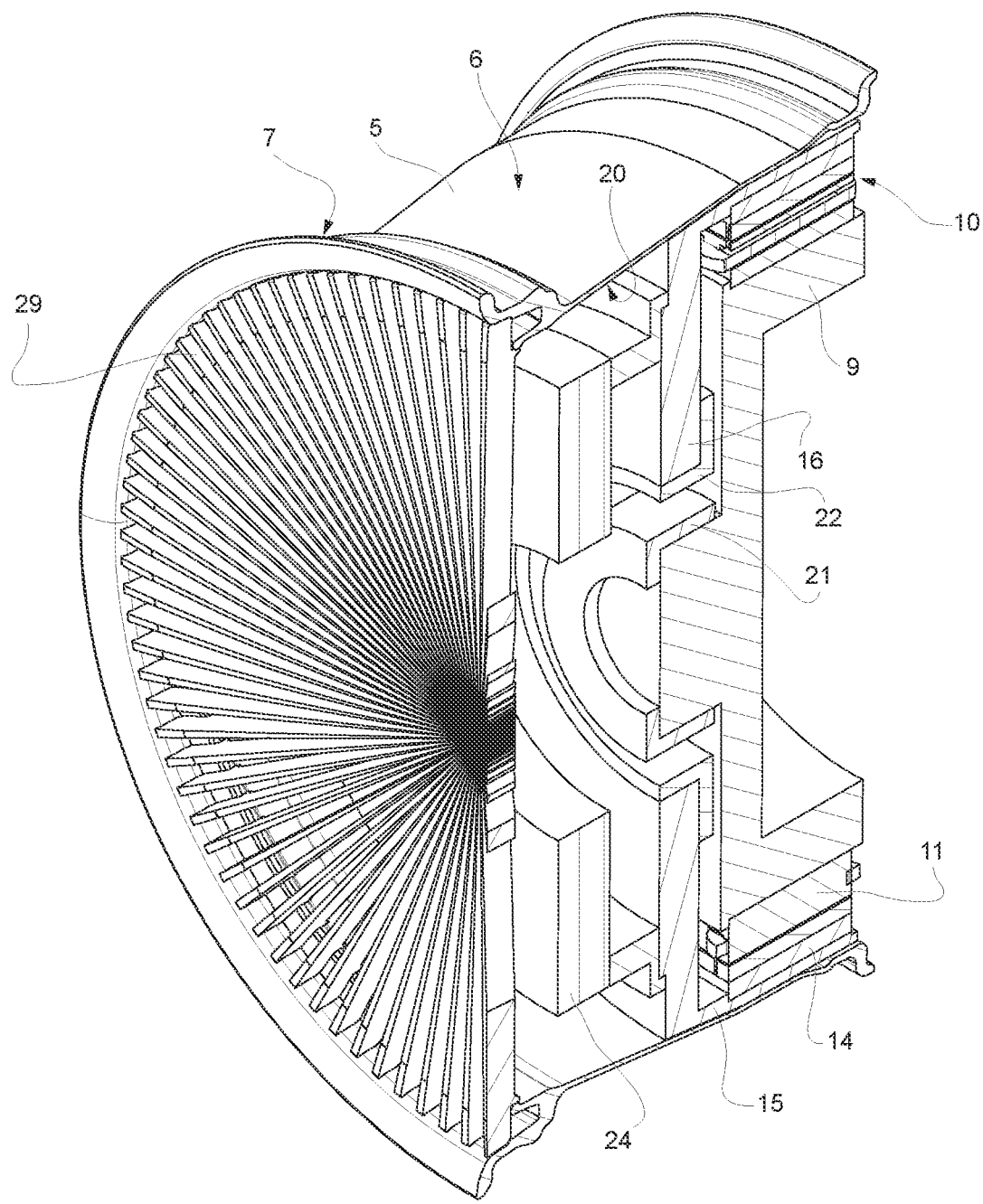
FIG. 4 is a cross section of the wheel device.

In fact, as can be directly and unambiguously derivable from FIG. 2, the rim 5 preferably has a tapered portion towards the H axis at the interference zone. In other words, the tapered portion is coupled to the rotor 12 with or by interference at the interference zone.

As known, the tapering precisely serves to facilitate interference coupling, whereby the presence of the tapered portion clearly indicates the location of the interference zone at the tapered portion.

In greater detail, the rim 5 has an inner surface 20 facing radially towards the axis H; the rotor 12 is directly in contact with the inner surface 20, in particular at the interference zone.

The rim 5 could comprise a portion arranged in contact with the rotor 12, where the latter portion comprises a polymer or an elastomer, e.g., a rubber, in particular vulcanized, e.g., instead of being entirely metallic.

In other words, the portion of the rim 5 comprising the polymer or elastomer would include the inner surface 20.

Therefore, the interference or the reciprocal contact between the rotor 12 and the rim 5 can take place between two respective metal materials (metal-metal contact) or between a metal material and a polymer or elastomer (metal-polymer/elastomer contact), or even between not completely metallic materials, without any loss of generality.

In general, the interference or mutual contact between the rim 5 and the rotor 12 does not exclude that the rotor 12 can be further attached to the rim 5 by further fixing means, such as threaded members for example. In fact, the wheel 4 could comprise additional fixing means for securing the rim 5 to the rotor 12.

The rim 5, as well as the rotor 12, could be made in a single piece or comprise several fixed portions or fixed to each other, without any loss of generality.

As already mentioned, the rim 5 is coupled to the rotor 12 by interference, whereby the inner diameter of the rim 5 may be smaller than the outer diameter of the rotor 12, although the rotor 12 is arranged radially inside the rim 5.

More precisely, the rotor 12 comprises a portion 15 which in particular is directly in contact with the rim 5 and is therefore coupled to the rim 5 by interference or mutual contact.

The portion 15 defines a housing accommodating the stator 11 and in particular also the portion 14; the latter is fixed with respect to the portion 15 and arranged radially inside the portion 15.

Specifically, the portion 15 has a bell-like shape.

More specifically, the portion 15 has a radially inner end 16 arranged at a radially inner location with respect to the stator 11.

The end 16 defines an axial bore 17 about the axis H.

The wheel hub 9 comprises a portion 18 arranged within the housing defined by the portion 15, as well as a portion 19 extending through the axial bore 17 along the axis H.

The stator 11 is carried by the wheel hub 9 at the portion 18. The portion 18 is coaxial to the ring defined by the portion 14 and is arranged radially within the same ring.

The radial bearing 13 comprises an inner ring 21, an outer ring 22, and rolling bodies 23 arranged radially between the inner ring 21 and the outer ring 22.

In particular, the rolling bodies 23 are defined by balls, more particularly by two crowns of balls.

Specifically, the radial bearing 13 is an oblique bearing, whereby it supports axial and radial loads. The mounting type of the radial bearing 13 is not described in detail but may be a mounting with the axes of the accident balls inside the radial bearing 13 (X-mounting) or outside the radial bearing 13 (O-mounting).

The outer ring 22 is arranged about the axis H and is fixed relative to the rotor 12. More precisely, the outer ring 22 is fixed to the rotor 12 at the end 16 within the axial bore 17.

Thus, implicitly, or alternatively as directly and unambiguously derivable from FIG. 2, the end 16 is radially aligned with the outer ring 22 and more generally with the radial bearing 13.

In other words, the end 16 extends radially from the rim 5, or more precisely from the interference zone to the outer ring 22.

The inner ring 21 is arranged about the axis H and is fixed with respect to the wheel hub 9. More precisely, the inner ring 21 is fixed to the wheel hub 9 at the portion 19 within the axial bore 17.

The inner ring 21 is radially outer than the portion 19, while the outer ring 22 is radially inner than the end 16.

Thus, the outer ring 22 rotates about the axis H relative to the inner ring 21 fixed relative to the wheel hub 9.

Here, the hub 9 intended as the central member or the radially innermost member of the wheel 4 is not rotatable about the axis H and more specifically it is fixed with respect to the axis H.

From this, it is clearly understood that the wheel hub 9 is the stator support.

Preferably, as directly and unambiguously derivable from FIG. 2, the radial bearing 13 externally supports the rotor 12 at an axially central zone of the rim 5, i.e., central according to the axis H.

In other words, the outer ring 22 and the radial end 16 are axially arranged at the axially central region.

Preferably, the wheel 4 comprises a brake disk 24 carried by the rotor 12, in particular at the end 16, in a fixed position relative to the rotor 12.

As can be directly derivable from the figures, the brake disk 24 is axially outer than the rotor 12. The term "axially outer" is intended to refer to the motor vehicle 1 and the axis H.

Then, the brake disk 24 faces the outside of the motor vehicle 1 according to the axis H and it is arranged in front of the rotor 12 or downstream of the rotor 12 going from the inside to the outside of the motor vehicle 1 according to the axis H.

The brake disk 24 is arranged outside the housing defined by the portion 15.

As directly derivable from the figures, the housing defined by the portion 15 faces the interior of the motor vehicle 1. The portion 15 is arranged between the brake disk 24 and the housing. In other words, the brake disk 24 is arranged on the opposite side of the housing facing the inside of the motor vehicle 1.

More precisely, the radial end 16 is arranged axially, i.e., according to the axis H, between the brake disk 24 and the housing defined by the portion 15.

Specifically, the wheel 4 comprises a spacer plate 25 axially arranged between the rotor 12 and the brake disk 24. The spacer plate 25 is attached to both the rotor 12 and the brake disk 24, e.g., by threaded members not shown.

Clearly, as derivable from the figures, the spacer plate 25 axially distances the brake disk 24 from the rotor 12.

Further preferably, the wheel 4 comprises a brake caliper device 26. The device 26 is configured to selectively cooperate in contact with the brake disk 24. In other words, the device 26 is controllable to grasp the brake disk 24, thus exerting a braking action on the rotor 12 by abrasive friction, and to release the brake disk 24, thus ceasing to exert the braking action.

Then, the device 26 and the brake disk 24 are part of a wheel braking device 4. Here, in such case, the braking device is suitable for emergency use or for making a parking brake or for use as an auxiliary braking device.

In fact, the electric motor 10 can be used as a brake when operating as an electric generator.

The device 26 is carried by the wheel hub 9. In other words, the device 26 has at least one element 27 fixed with respect to the wheel hub 9.

In particular, the device 26 comprises at least one portion 28 extending within the inner ring 21.

Conveniently, the wheel 4 comprises a rim cover 29 frontally fixed to the rim 5, e.g., by means of a shape coupling or by means of threaded members.

The rim cover 29 is attached to the rim 5 in a releasable or removable fashion, in the sense that the separation of the rim cover 29 from the rim 5 can take place without causing damage to the rim cover 29 or the rim 5.

In other words, the rim cover 29 is optional and removable.

Therefore, necessarily, removing the rim cover 29 involves releasing an opening of the rim 5; the latter opening is configured to receive the rim cover 29.

Therefore, as directly derivable from the figures, the opening is directly communicating with an outer side of the motor vehicle 1.

More precisely, the opening faces the external side according to a direction away from the motor vehicle 1.

As directly inferred from the figures, the brake disk 24 is arranged between the rotor 12 and the opening, according to the axis H.

Preferably, the wheel 4 comprises one or more sensors coupled to the rotor 12 or more precisely to the portion 15 and configured to detect one or more quantities indicative of a force and/or a torque acting on the rim 5 and consequently on the rotor 12 itself.

The force or torque may have multiple force or torque components in three-dimensional space, so the magnitudes may be indicative of the force or torque components, respectively.

For instance, the sensors may be straining gauges fixed to the rotor 12 or more precisely to the portion 15, in particular directly fixed.

From the above, the advantages of the wheel 4 according to the invention are evident.

The wheel 4 integrates the electric motor 10 in a simple, effective, and efficient manner.

The rotor 12 is integral with the rim 5 by means of the interference coupling; this type of coupling makes it possible not to use gearmotors.

The fact that the rotor 12 is fixed with respect to the outer ring 22, i.e. the fact that the rotor 12 is externally supported by the radial bearing 13 allows a more central arrangement, according to the axis H, of the interference zone between the rim 5 and the rotor 12, as well as a radial alignment of the interference zone with the radial bearing 13.

In this way, since the loads on the rim 5 during use of the motor vehicle 1 are typically discharged centrally according to the axis H, the radial bearing 13 better supports such loads and is minimally subject to torque due to a radial misalignment between the interference zone and the center of the radial bearing 13.

This results in a greater robustness and reliability of the wheel 4.

Furthermore, the interference coupling minimizes the number of components needed for operation of the wheel 4.

The wheel 4 is thus easily manufacturable and reliable.

Furthermore, the sensors would allow the direct acquisition of information directly indicative of the force and/or torque acting on the rim 5 and useful for a control of the dynamics of the motor vehicle 1. These sensors are more accurate and sensitive than estimates made based on indirect measurements of the force and/or torque acting on the rim 5.

Finally, it is clear that modifications and variations can be made to wheel 4 according to the invention, which however do not fall outside the scope of protection defined by the claims.

In particular, each of the details included in the figures is independent of the other details and is specifically designed to solve specific technical problems in isolation from the other details.

In particular, each of the details included in the figures is independent of the other details and is specifically designed to solve specific technical problems in isolation from the other details.

In particular, the mentioned details include each of the arrangements of the various components illustrated with respect to the other components.

More particularly, the illustrated shapes and dimensions are merely exemplary and are not inextricably linked to the arrangement of the components.

The invention claimed is:

1. A wheel device (4) for a motor vehicle (1), the device (4) comprising:
   a rim (5) having an axis (H) and an outer surface (6) defining a seat (7) for mounting a tire (8),
   a wheel hub (9) arranged about the axis (H) inside the rim (5) and suitable for being coupled to a suspension of the motor vehicle (1),
   an electric motor (10) comprising a stator (11) arranged coaxially with the wheel hub (9) in a fixed position relative to the wheel hub (9) and a rotor (12) configured to magnetically interact with the stator (11),
   a radial bearing (13) rotatably supporting the rotor (12) about said axis (H) with respect to the wheel hub (9) and stator (11),
   characterized in that the rim (5) is fitted on the rotor (12) with interference, whereby the rim (5) is fixed with respect to the rotor (12), wherein the radial bearing (13) comprises an outer ring (22) arranged about said axis (H) and fixed with respect to the rotor (12).

2. The device according to claim 1, wherein the rotor (12) comprises at least a first rotor portion (14, 15) arranged coaxially with the stator (11) in a radially outer position with respect to the stator (11), the rim (5) being fitted on the first rotor portion (14, 15).

3. The wheel device according to claim 1, further comprising a brake disk (24) carried by the rotor (12) in a fixed position with respect to the rotor (12).

4. The wheel device according to claim 1, wherein the radial bearing (13) comprises an inner ring (21) arranged about said axis (H) and fixed with respect to the wheel hub (9).

5. The wheel device of claim 4, further comprising a brake caliper device (26) carried by the wheel hub (9) and having at least one portion (28) extending within the inner ring (21) of the radial bearing (13).

6. The device according to claim 1, wherein the rotor (12) comprises a second rotor portion (14) comprising one or more permanent magnets configured to generate a magnetic flux, the stator (11) comprising electrical windings (30) configured to generate a magnetic field interacting with said magnetic flux in response to a flow of electrical current through the windings (30).

7. The device of claim 6, wherein said magnetic flux is directed radially toward the stator (11).

8. The device according to claim 1, wherein the rotor (12) comprises a third rotor portion (14) defining a rotor ring about said axis (H), the stator (11) comprising a stator portion (18) coaxial to the rotor ring and arranged radially within the rotor ring.

9. The device according to claim 1, wherein the rotor (12) comprises a fourth portion (15) defining a housing accommodating the stator (11).

10. The device according to claim 1, further comprising one or more sensors coupled to the rotor (12) and configured to detect one or more quantities indicative of a force or torque acting on the rim (5) or on the rotor (12).

11. The wheel device according to claim 1, wherein the rim (5) is fitted on the rotor (12) with interference at an interference zone between the rim (5) and the rotor (12), the interference zone being radially aligned with the radial bearing (13).

12. A wheel device (4) for a motor vehicle (1), the device (4) comprising:
   a rim (5) having an axis (H) and an outer surface (6) defining a seat (7) for mounting a tire (8),
   a wheel hub (9) arranged about the axis (H) inside the rim (5) and suitable for being coupled to a suspension of the motor vehicle (1),
   an electric motor (10) comprising a stator (11) arranged coaxially with the wheel hub (9) in a fixed position relative to the wheel hub (9) and a rotor (12) configured to magnetically interact with the stator (11),
   a radial bearing (13) rotatably supporting the rotor (12) about said axis (H) with respect to the wheel hub (9) and stator (11), wherein the radial bearing (13) comprises an inner ring (21) arranged about said axis (H) and fixed with respect to the wheel hub (9),
   characterized in that the rim (5) is fitted on the rotor (12) with interference, whereby the rim (5) is fixed with respect to the rotor (12), and
   a brake caliper device (26) carried by the wheel hub (9) and having at least one portion (28) extending within the inner ring (21) of the radial bearing (13).

* * * * *